L. YAKEL,

Assignor to BROWN & Co.

MACHINE FOR ROLLING SOCKET BLANKS FOR OIL WELL RODS.

No. 10,314. Reissued Apr. 10, 1883.

Witnesses
R. F. Whittlesey
C. L. Parker

Inventor Levi Yakel
By Attorney George H. Christy

N. PETERS. Photo-Lithographer, Washington, D. C.

UNITED STATES PATENT OFFICE.

LEVI YAKEL, OF ALLEGHENY, PENNSYLVANIA, ASSIGNOR TO BROWN & CO.

MACHINE FOR ROLLING SOCKET-BLANKS FOR OIL-WELL RODS.

SPECIFICATION forming part of Reissued Letters Patent No. 10,314, dated April 10, 1883.

Original No. 183,739, dated October 24, 1876. Application for reissue filed July 9, 1881.

*To all whom it may concern:*

Be it known that I, LEVI YAKEL, of Allegheny, Pennsylvania, have invented certain new and useful Improvements in the Manufacture of Blanks for Sockets for Oil-Well Rods, of which the following is a clear, full, and exact description, reference being had to the accompanying drawings, making a part of this specification, in which—

Figure 1:
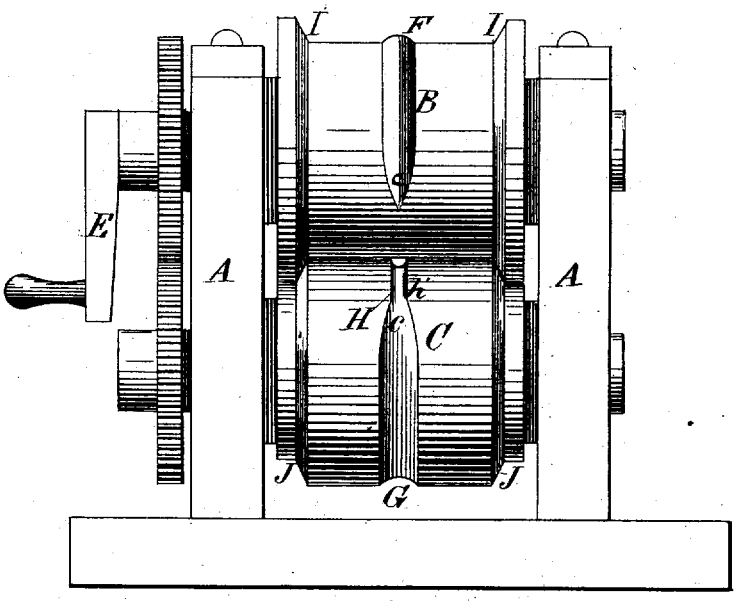
Figure 2:
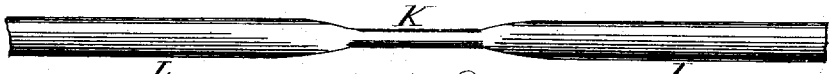
Figures 3, 4:
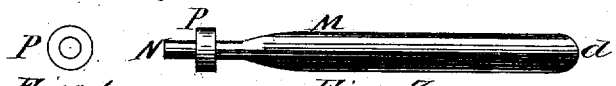

Figure 1 represents a front elevation of my improved rolls for rolling blanks. Fig. 2 represents a rolled blank. Fig. 3 represents a socket made from my improved blanks. Fig. 4 represents a socket-collar, and Fig. 5 represents a partially-rolled blank.

My invention relates to the manufacture of blanks for sockets used principally on oil-well rods; and it consists in certain combinations of devices for rolling the socket-blank and in the blank thus formed, as hereinafter described and claimed.

In the drawings, A A represent standards or housings, which furnish bearings for the rollers B C. On the roller B is formed the elongated die F, tapered at its forward end, and on the roller C is a groove or matrix, G, of corresponding shape, the groove, however, extending entirely around the roller C, and where not occupied by the die it is shaped as shown at H *h'*, to make the part K of the blank which forms the shank. The roller B is provided with the flanges or collars I I to embrace the ends of the roller C, as shown in Fig. 1, the flanges fitting in the depressions J J of roll C, thus securing a steady movement of the die and matrix as the blanks pass between the rollers, and preventing the die from moving or shifting out of its proper position to one side or the other of the matrix. The rollers are provided with the ordinary cog-gearing, and may be operated by means of the crank E, or by the application of steam or other power. After the blank L has been properly formed by passing it between the rollers B C, as above described, it is severed at the middle of the part K, the two parts are brought together and welded or otherwise secured, as shown in Fig. 3, and the opposite ends trimmed, as at *d*, the socket part M being then ready for the reception of the rod. Over the shank N of the socket is passed and secured the ring or collar P, to form a shoulder and give greater security to the socket.

Figure 5:
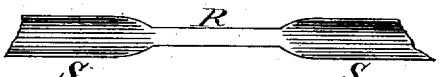

Fig. 5 shows a blank partially rolled, the parts *s s* showing the portions of the blank acted on by the dies, and the portion R representing the portion which is to be formed into the part N, as seen in Fig. 3.

The tapering feature of construction above referred to as appertaining to the die F and matrix G is more particularly illustrated at *c c'*, Fig. 1.

The work performed by the rolls and dies described on the iron passing through is chiefly a reducing, spreading, and shaping operation. The skilled operator will select the bar to be rolled, or shape it by a previous operation, in accordance with rules well known in the art. If the bar so selected or prepared be already of the shape and approximately of the size of the part K or R, little or no reduction will be made by the dies H *h'*; but if the bar be otherwise shaped than is desired for the parts K or R, then such parts will be brought to shape in passing through.

I claim herein as my invention—

1. In combination with suitable housings, the roller B, provided with the die F, tapering at its forward end, and the roller C, provided with the matrix G and connecting-groove H *h'*, substantially as set forth.

2. A rolled blank having a part, K, for the formation of a socket-shank, and a concavo-convex part, L, on one or both ends thereof, substantially as set forth.

In testimony whereof I have hereunto set my hand.

LEVI YAKEL.

Witnesses:
R. H. WHITTLESEY,
C. L. PARKER.